(12) United States Patent
Whitney et al.

(10) Patent No.: US 8,190,126 B1
(45) Date of Patent: May 29, 2012

(54) COVERT MODE COMMUNICATION

(75) Inventors: Jason Kent Whitney, Lee's Summit, MO (US); Michael T. Lundy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 904 days.

(21) Appl. No.: 12/060,320

(22) Filed: Apr. 1, 2008

(51) Int. Cl.
*H04M 1/68* (2006.01)

(52) U.S. Cl. ..... 455/411; 455/415; 455/445; 455/456.1; 455/412.1; 455/412.2; 380/229; 380/248; 380/250; 713/183; 713/184; 726/11; 726/14

(58) Field of Classification Search ............... 455/411, 455/415, 445, 456.1, 412.1, 412.2; 380/229, 380/248, 250; 713/183, 184; 726/11, 14
See application file for complete search history.

(56) References Cited

U.S. PATENT DOCUMENTS

| | | | |
|---|---|---|---|
| 5,493,692 A | | 2/1996 | Theimer et al. |
| 5,640,419 A * | | 6/1997 | Janusas ............ 375/239 |
| 5,870,215 A * | | 2/1999 | Milano et al. ........ 398/108 |
| 5,923,849 A * | | 7/1999 | Venkatraman ........ 709/224 |
| 5,933,785 A | | 8/1999 | Tayloe |
| 5,987,325 A | | 11/1999 | Tayloe |
| 6,163,564 A * | | 12/2000 | Rudish et al. ........ 375/130 |
| 6,583,714 B1 | | 6/2003 | Gabou et al. |
| 7,209,955 B1 * | | 4/2007 | Major et al. .......... 709/207 |
| 7,250,846 B2 | | 7/2007 | Ebling et al. |
| 2002/0113688 A1 * | | 8/2002 | Ide .................. 340/7.55 |
| 2005/0025315 A1 * | | 2/2005 | Kreitzer ............. 380/270 |
| 2005/0064854 A1 * | | 3/2005 | Jang ................ 455/415 |
| 2006/0025112 A1 * | | 2/2006 | Hamanaga et al. .... 455/412.1 |
| 2006/0104445 A1 | | 5/2006 | Lai et al. |
| 2006/0123224 A1 * | | 6/2006 | Klug et al. ........... 713/150 |
| 2007/0072616 A1 * | | 3/2007 | Irani ................ 455/441 |
| 2009/0088168 A1 * | | 4/2009 | Varanasi ............ 455/445 |

FOREIGN PATENT DOCUMENTS

| | | |
|---|---|---|
| EP | 1681841 | 7/2006 |
| EP | 1717685 | 11/2006 |
| EP | 1775669 | 4/2007 |
| WO | 2005050857 | 6/2005 |
| WO | 2009050254 | 4/2009 |

OTHER PUBLICATIONS

Sprint; "Phone User Guide—Sprint PCS Vision Phone SCP-7000 by Sanyo," Jan. 2006; pp. 1-254; Sprint Nextel; http://support.sprint.com/global/pdf/user_guides/sanyo/scp7000/scp7000_by_sanyo_ug.pdf.

Amy K. Karlson, et al.; "Can I Borrow Your Phone? Understanding Concerns When Sharing Mobile Phones," CHI 2009 ~ Studying Cell Phone Use; Apr. 8, 2009; pp. 1647-1650; Microsoft Research; Boston, MA.

* cited by examiner

*Primary Examiner* — Nimesh Patel (57) ABSTRACT

A communication device having a secret mode enters the secret mode in response to receiving a secret mode access key. In the secret mode, the communication device receives a first instruction to handle a covert communication source in the secret mode. The communication device receives a second instruction to exit the secret mode. After exiting the secret mode, and in response to the first instruction, the communication device provides a covert communication alert for an incoming communication from the covert communication source. The communication device provides overt communication alerts for incoming communications from overt communication sources.

16 Claims, 9 Drawing Sheets

SECRET MODE MENU

1. VIEW COVERT CALL HISTORY

2. VIEW COVERT TEXT HISTORY

3. VIEW COVERT IM HISTORY

4. VIEW COVERT EMAIL HISTORY

5. TRANSMIT COMMUNICATION (CALL, TEXT, IM, EMAIL)

6. VIEW COVERT CONTACT LIST

7. CHANGE ALERT TYPE

8. CHANGE COVERT ALERTING DEVICE

9. ADD COVERT CONTACT

10. DELETE COVERT CONTACT

11. CONVERT COVERT CONTACT TO OVERT CONTACT

12. CONVERT OVERT CONTACT TO COVERT CONTACT

13. RETRIEVE COVERT VOICEMAIL

FIGURE 9

COVERT MODE COMMUNICATION

TECHNICAL BACKGROUND

Wireless telephone users today are alerted to a call or message on their wireless telephone by a sound or a vibration. Alternatively, a user may turn their wireless telephone alerts off completely so that they must check their wireless telephone to see if they have received any calls or messages.

An issue arises when a wireless telephone user would like to be alerted to some incoming calls, but not to others. There are also times when a wireless telephone user would like to be alerted to an incoming call or message without being detected by anyone else in the proximity. Further, a user may want to keep a private contact list and communication history on their wireless telephone that is not accessible to others.

OVERVIEW

A communication device having a secret mode enters the secret mode in response to receiving a secret mode access key. In the secret mode, the communication device receives a first instruction to handle a covert communication source in the secret mode. The communication device receives a second instruction to exit the secret mode. After exiting the secret mode, and in response to the first instruction, the communication device provides a covert communication alert for an incoming communication from the covert communication source. The communication device provides overt communication alerts for incoming communications from overt communication sources.

DETAILED DESCRIPTION

Figure 1:
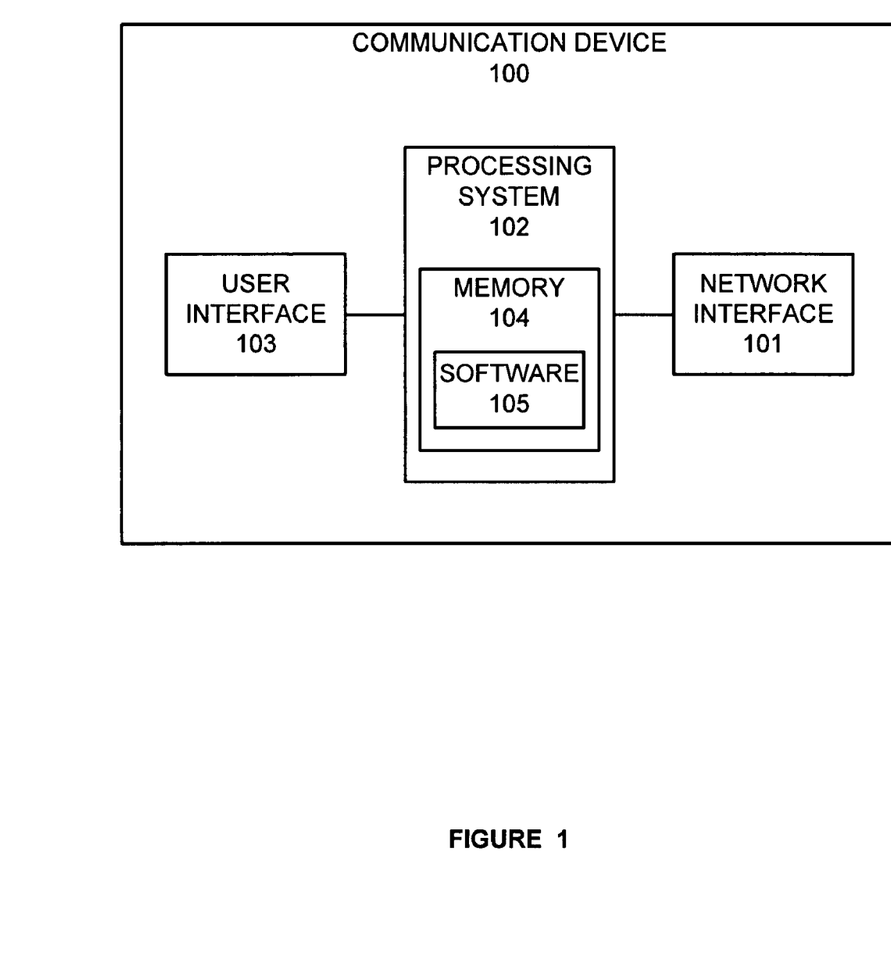
FIG. 1 is a block diagram that illustrates a communication device.

FIG. 1 is a block diagram that illustrates communication device 100. Communication device 100 comprises network interface 101, processing system 102, and user interface 103. Processing system 102 comprises memory 104. Memory 104 stores software 105. Processing system 102 is linked to network interface 101 and user interface 103. Communication device 100 comprises a wireless telephone, an Internet appliance, a pager, a personal digital assistant, a computer, or some other wireless transceiver. Communication device 100 may be distributed among multiple devices that together comprise elements 101-105.

Network interface 101 comprises transceiver circuitry that provides Bluetooth, Wireless Fidelity (Wi-Fi), Worldwide Interoperability for Microwave Access (WiMAX), Radio Frequency (RF), or some other form of wireless communication. Network interface 101 may be distributed among multiple components. Processing system 102 comprises, in addition to memory 104, a computer microprocessor, logic circuit, or some other processing device. Memory 104 comprises a disk, tape, integrated circuit, server, or some other memory device. Memory 104 may be distributed among multiple memory components. Processing system 102 may be distributed among multiple processing components. User interface 103 comprises a keypad, mouse, voice recognition interface, microphone and speakers, graphical display, touch screen, or some other type of user device. User interface 103 may be distributed among multiple user components.

Processing system 102 retrieves and executes software 105 from memory 104. Software 105 comprises an operating system, utilities, drivers, networking software, or other software typically loaded onto a communication device. Software 105 comprises an application program, firmware, or some other form of machine-readable processing instructions. When executed by processing system 102, software 105 directs processing system 102 to operate as described herein.

Figure 2:
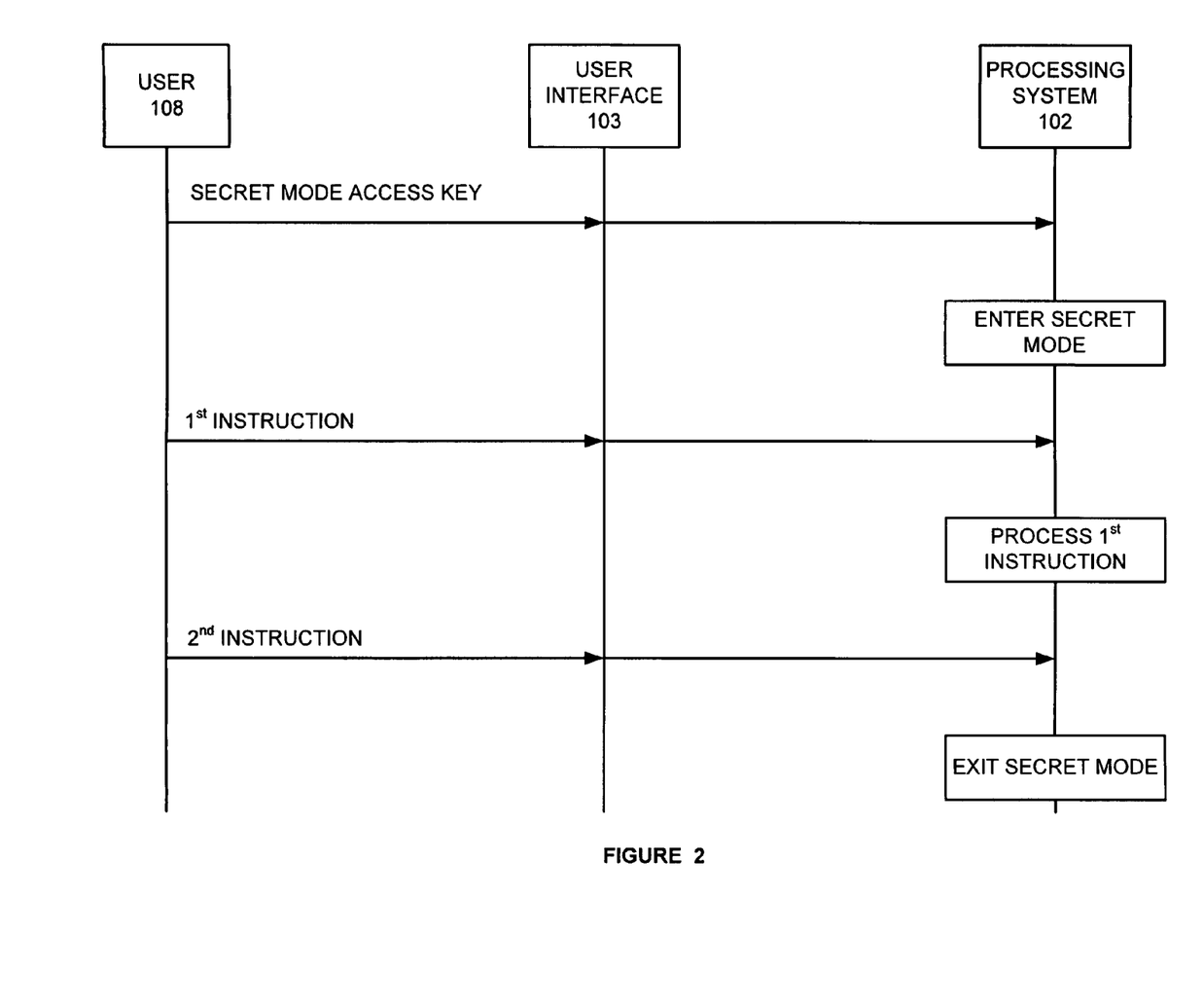
FIG. 2 is a sequence diagram that illustrates a method of operating a communication device.

FIG. 2 is a sequence diagram that illustrates the operation of communication device 100. A user (user 108 in FIG. 2) enters a secret mode access key through user interface 103. The secret mode access key comprises a password, number sequence, biometric data, or some other form of passcode. The secret mode access key is not displayed in user interface 103, but is, instead, blacked out or hidden. User interface 103 transmits the secret mode access key to processing system 102. In response to receiving the secret mode access key, processing system 102 enters a secret mode.

Once communication device 100 is in secret mode, the user enters a first instruction through user interface 103. The first instruction indicates a covert communication source. The covert communication source might be indicated by a telephone number, an email address, an instant messaging (IM) ID, or some other form of communication source identifier. User interface 103 transmits the first instruction to processing system 102. Processing system 102 receives and processes the first instruction to handle the covert communication source.

The user then enters a second instruction through user interface 103. The second instruction comprises an instruction to exit the secret mode. User interface 103 transmits the second instruction to processing system 102. Processing system 102 receives and processes the second instruction and exits the secret mode.

Figure 3:
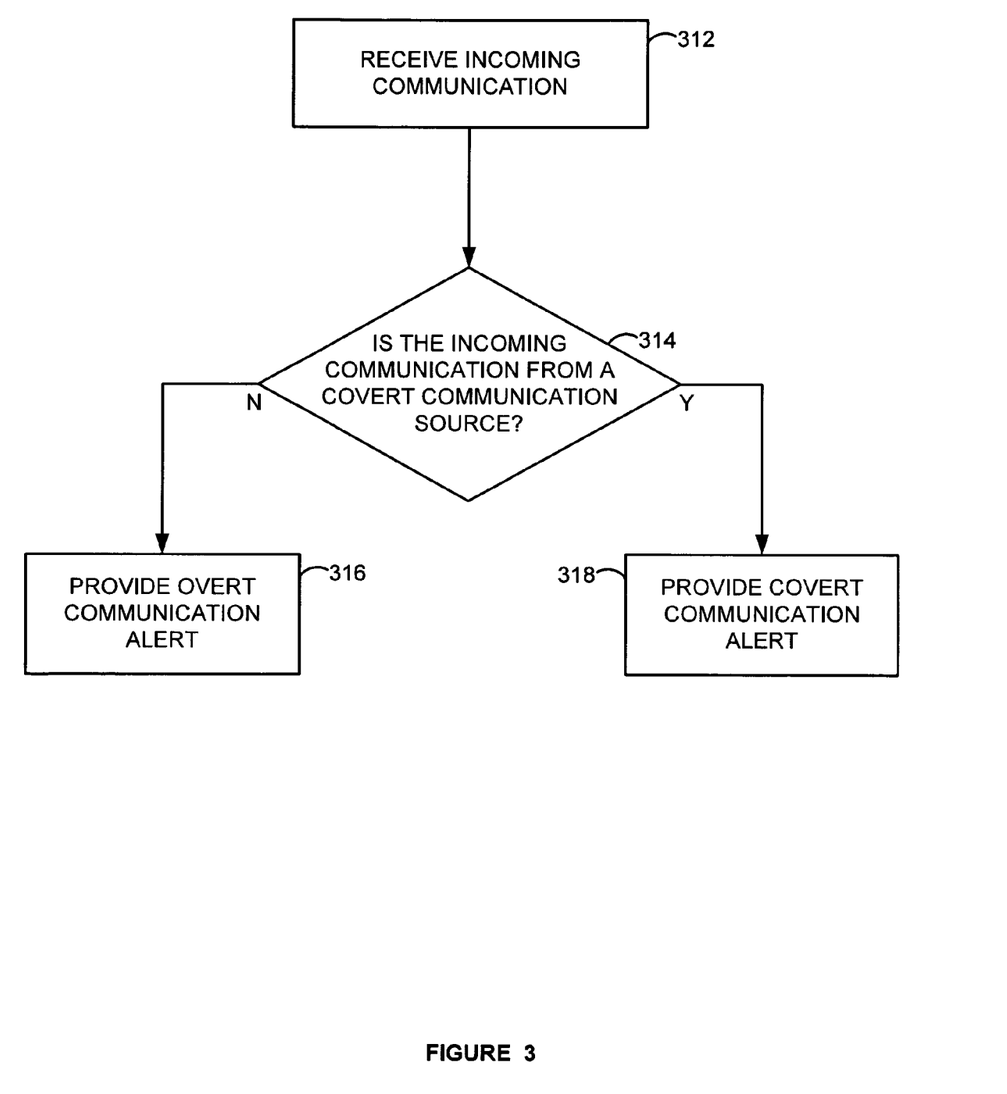
FIG. 3 is a flow diagram that illustrates a method of operating a communication device.

FIG. 3 is a flow diagram that further illustrates the operation of communication device 100. After the user has entered instructions on handling the covert communication source and communication device 100 has exited the secret mode as illustrated in FIG. 2, communication device 100 receives an incoming communication through network interface 101 (operation 312). The incoming communication comprises a telephone call, a text message, a picture message, an instant message, a voicemail, an email, or any other form of wireless communication.

Network interface 101 transmits the incoming communication to processing system 102. Software 105 drives processing system 102 to determine whether the incoming communication is from the covert communication source (operation 314). The covert communication source comprises the covert communication source about which the user entered the first instruction in FIG. 2. If the incoming communication is not from the covert communication source, then it is from an overt communication source. An overt communication source comprises any communication source which a user has not designated as a covert communication source in the secret mode.

If the incoming communication is from the covert communication source, then communication device 100 provides a covert communication alert (operation 318). The covert communication alert comprises no alert (no sound, no movement, and no change in user interface 103) or a silent, visual change in user interface 103 that is not typically associated with an incoming communication. For example, the covert change in user interface 103 could be a change in a location of a display item, a rotation of the display item, a change in color of the display item, or any other subtle visual alteration in user interface 103. The display item comprises a battery icon, a calendar, a time, a date, a signal strength indicator, or any other element of user interface 103. The covert communication alert is not obvious to anyone near communication device 100.

If the incoming communication is not from the covert communication source (i.e. is from an overt communication source), then communication device 100 provides an overt communication alert (operation 316). The overt communication alert comprises an audible or visual indicator that is typically associated with an incoming communication. For example, the overt communication alert could be an audible sound, a ringtone, a vibration, the appearance of an envelope icon, an evident change in user interface 103, or any other explicit alert. The overt change in user interface 103 comprises a flashing display, a textual display, a color-changing display, or any other obvious alteration in user interface 103.

Figure 4A:
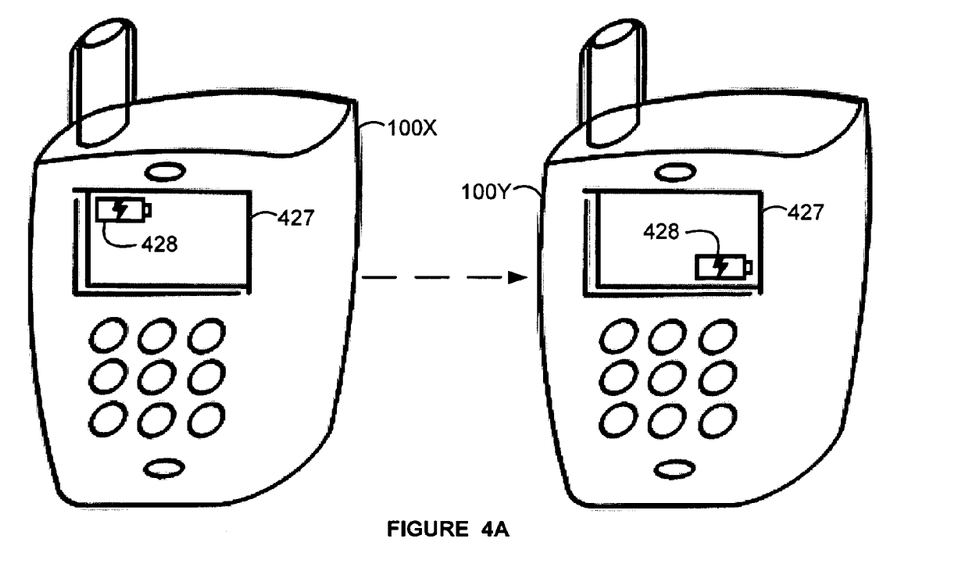
FIG. 4A is a block diagram that illustrates a communication device.
Figure 4B:
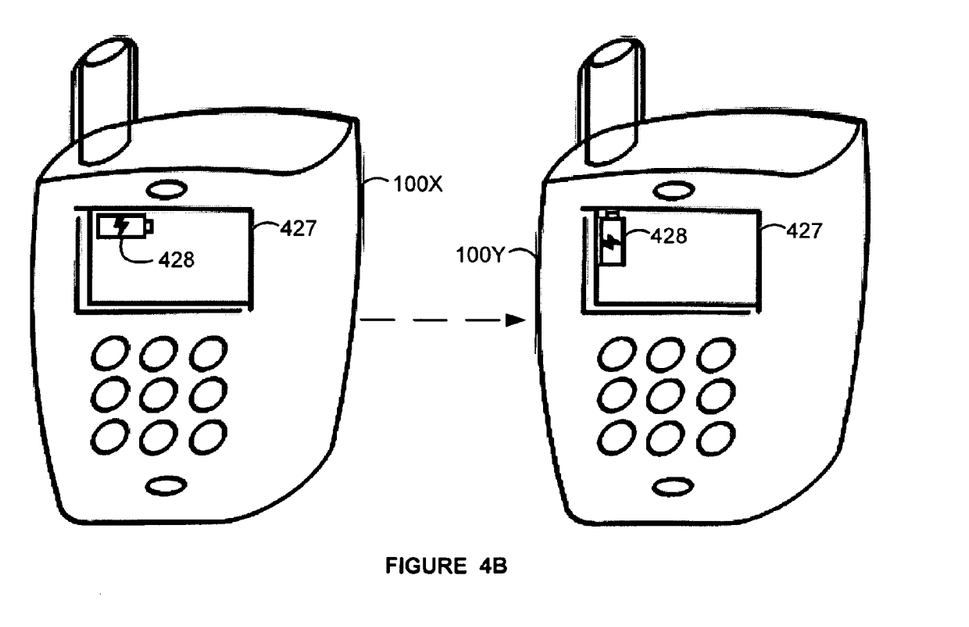
FIG. 4B is a block diagram that illustrates a communication device.

FIGS. 4A and 4B illustrate examples of a covert communication alert in communication device 100, wherein the covert communication alert comprises only changing a location of a displayed item.

In FIG. 4A, communication device 100X represents communication device 100 before receiving an incoming communication. Communication device 100Y represents communication device 100 after receiving an incoming communication from a covert communication source and after providing a covert communication alert. Communication device 100 comprises display 427 and battery power indicator 428. In communication device 100X, battery power indicator 428 is shown in its normal position in the top right-hand corner of display 427. In communication device 100Y, battery power indicator 428 has been moved to a new position in the bottom left-hand corner of display 427 to indicate a covert communication alert in response to an incoming communication from a covert communication source.

In FIG. 4B, communication device 100X represents communication device 100 before receiving an incoming communication. Communication device 100Y represents communication device 100 after receiving an incoming communication from a covert communication source and after providing a covert communication alert. Communication device 100 comprises display 427 and battery power indicator 428. In communication device 100X, battery power indicator 428 is shown in its normal position in the top right-hand corner of display 427. In communication device 100Y, battery power indicator 428 has been rotated ninety degrees counterclockwise to indicate a covert communication alert in response to an incoming communication from a covert communication source.

Additionally, the covert communication alert may be personalized for different covert communication sources. For example, in response to the receipt of an incoming communication from covert communication source A, communication device 100 may change the color of battery power indicator 428. Further, in response to the receipt of an incoming communication from covert communication source B, communication device 100 may rotate battery power indicator 428 ninety degrees. A covert alert option could be associated with a specific covert communication source or with a specific covert communication priority level.

In one example, a covert alert comprises a data message that is transferred to a user-specified location. The covert alert could be a text message transferred to another communication device, an email sent from the communication device to a user-defined email address, an Instant Message, or any other type of data message transferred to a user-defined location.

In one embodiment, a communication device may process all incoming communications covertly as the default setting. Incoming communications would only be processed overtly if they were placed on an overt communication list.

Figure 5:
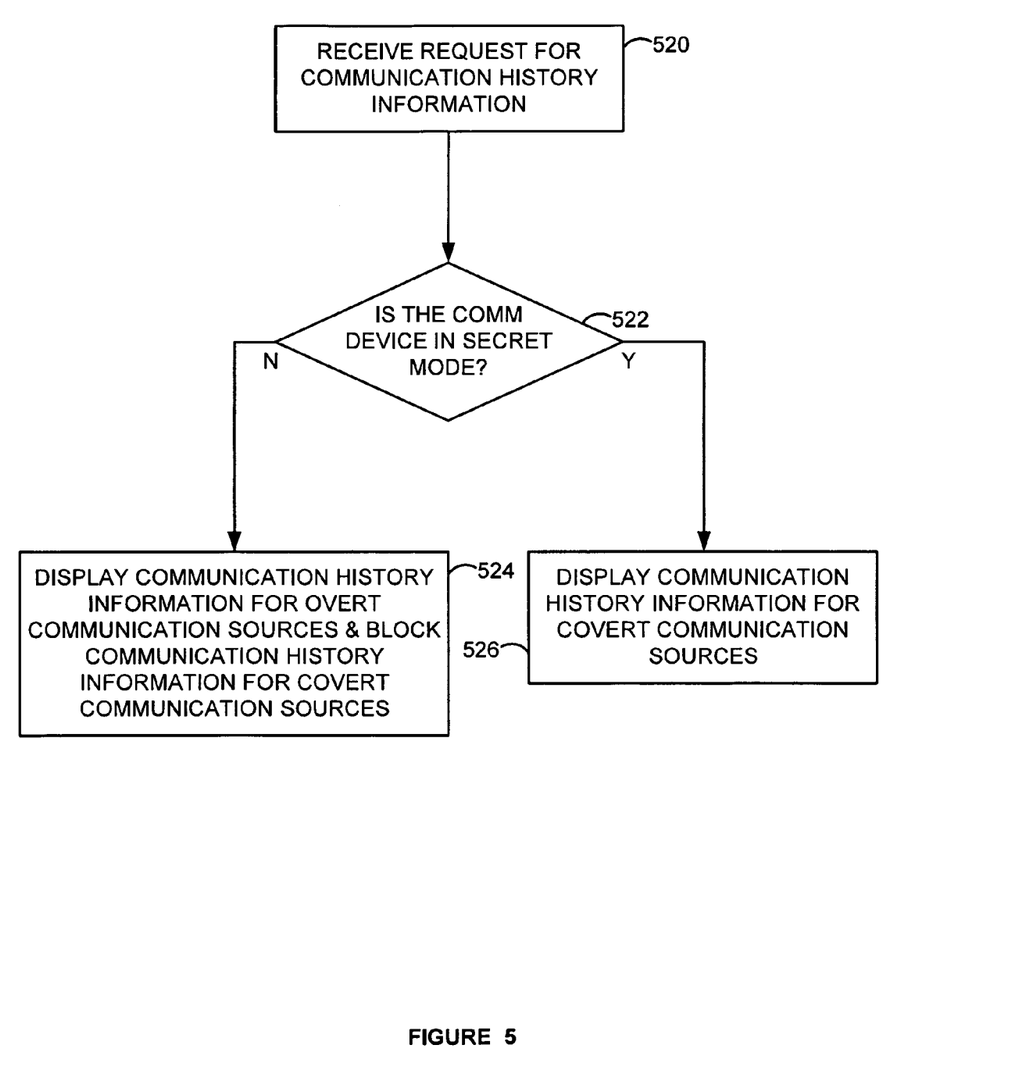
FIG. 5 is a block diagram that illustrates a communication device.

FIG. 5 is a flow diagram that further illustrates the operation of communication device 100. After a user has entered instructions on handling the covert communication source and communication device 100 has exited the secret mode as illustrated in FIG. 2, communication device 100 receives a request for communication history information from the user (operation 520). Communication history information comprises communication sources, communications received, communications sent, pending communications, missed communications, and any other communication history stored on communication device 100.

In response to the request for communication history information, communication device 100 determines whether or not the communication device is in secret mode (operation 522). If communication device 100 is not in secret mode, then communication device 100 displays communication history information related to overt communication sources and blocks communication history information related to covert communication sources (operation 524).

If communication device 100 is in secret mode (i.e. a user entered a secret mode access key and communication device 100 entered secret mode), then communication device 100 displays communication history information related to covert communication sources (operation 526).

Figure 6:
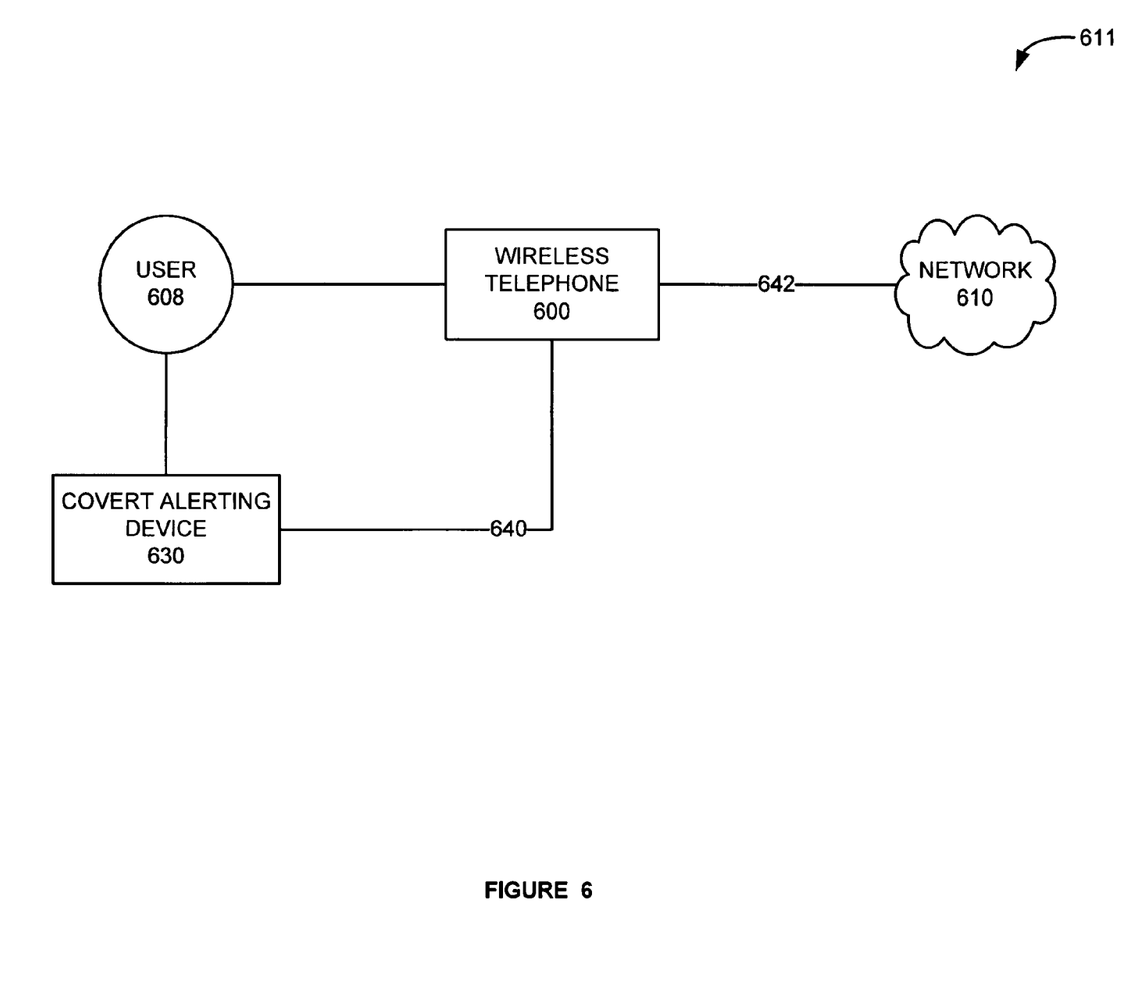
FIG. 6 is a block diagram that illustrates a communication system.

FIG. 6 is a block diagram that illustrates communication system 611. Communication system 611 comprises wireless telephone 600, network 610, user 608, and covert alerting device 630. User 608 is in communication with wireless telephone 600 and covert alerting device 630.

Covert alerting device 630 comprises a watch, a ring, a piece of jewelry, a pen, or any other personal accessory. Covert alerting device 630 is shown in greater detail in FIG. 8.

Network 610 comprises a telephone system, an Internet access system, a data system, a media (audio/video) system, a service platform, or some other system that provides a communication service to wireless telephone 600.

Wireless telephone 600 and network 610 communicate over link 642. Link 642 comprises a wireless communication link using Wi-Fi, WiMAX, Code Division Multiple Access (CDMA), Global System for Mobile communications (GSM), or any other form of wireless communication. Link 642 may be a direct wireless link or may comprise various intermediate systems and components.

Wireless telephone 600 and covert alerting device 630 communicate over link 640. Link 640 comprises Bluetooth, Wi-Fi, WiMAX, RF, or any form of wireless communication that could transmit between wireless telephone 600 and covert alerting device 630.

Figure 7:
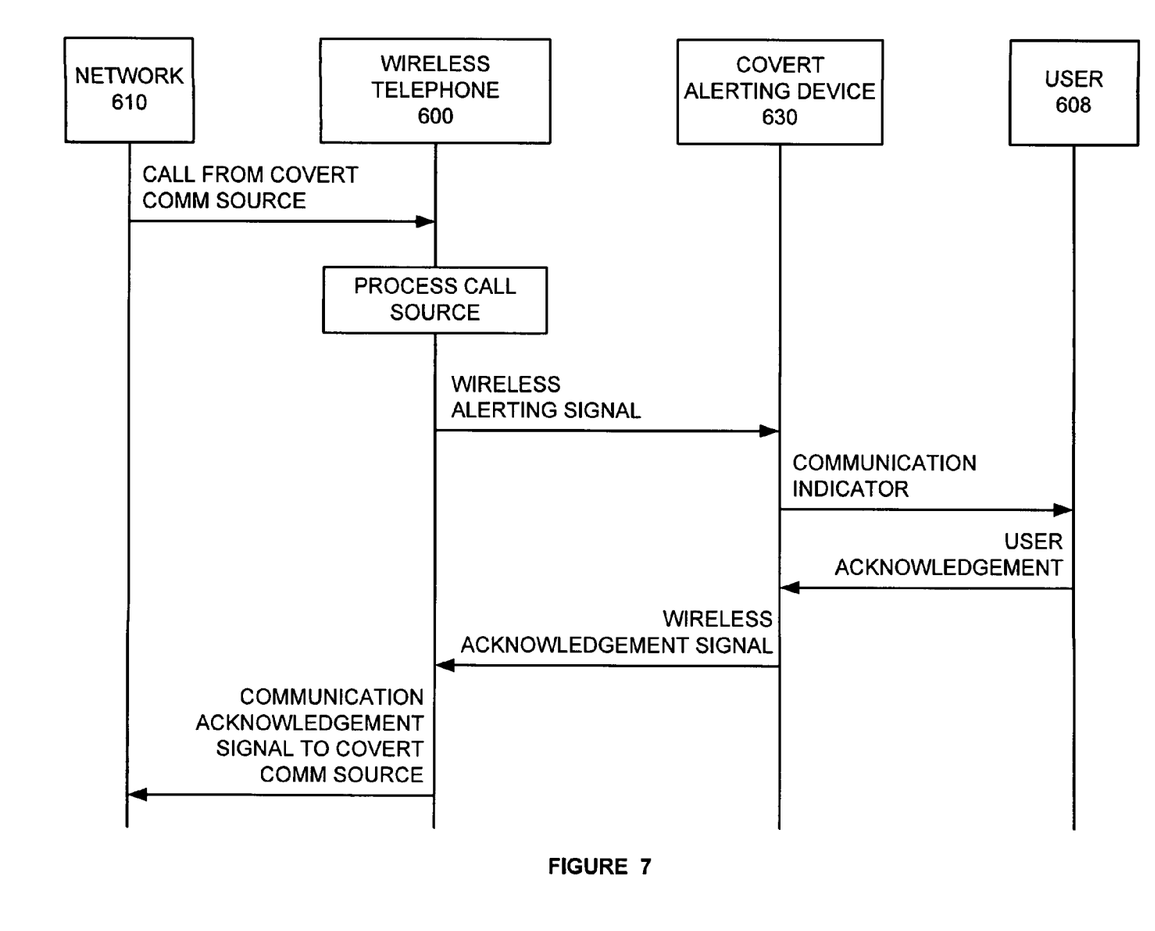
FIG. 7 is a sequence diagram that illustrates a method of operating a communication system.

FIG. 7 is a sequence diagram that illustrates the operation of communication system 611. After user 608 has entered instructions on handling a covert communication source and wireless telephone 600 has exited the secret mode as previously discussed, network 610 transmits a call from the covert communication source to wireless telephone 600 over link 642. Wireless telephone 600 processes the incoming call to determine that it is from the covert communication source. Since the call in this example is from the covert communication source, wireless telephone 600 transmits a wireless alerting signal to covert alerting device 630 over link 640. In response to receiving the wireless alerting signal, covert alerting device 630 provides a communication indicator to user 608.

The communication indicator is a silent indicator that is not typically associated with an incoming communication. For example, the communication indicator could be a physical protrusion, a rotating wheel, a moving bristle, or any physical touch alert that is perceptible only to user 608. The communication indicator could be a covert communication alert as described above.

After user 608 perceives the communication indicator from covert alerting device 630, user 608 produces a user acknowledgement of the communication indicator. In response to receiving the user acknowledgement, covert alerting device 630 transmits a wireless acknowledgement signal to wireless telephone 600 over link 640. Wireless telephone 600 receives the wireless acknowledgement signal, and in response, transmits a communication acknowledgement signal to the covert communication source (not shown) over link 642 and network 610.

Figure 8:
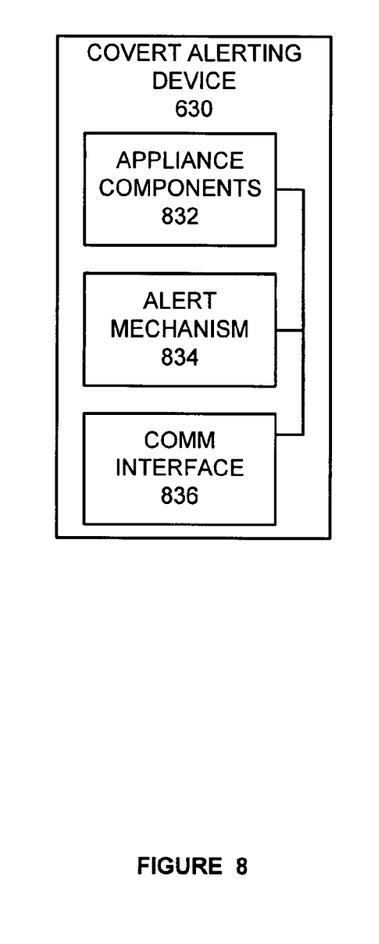
FIG. 8 is a block diagram that illustrates a covert alerting device.

FIG. 8 is a block diagram that illustrates covert alerting device 630. Covert alerting device 630 comprises appliance components 832, alert mechanism 834, and communication interface 836. Appliance components 832, alert mechanism 834, and communication interface 836 are in communication with one another.

Appliance components 832 comprise the structure and functionality of covert alerting device 630. For example, if covert alerting device 630 is a wristwatch, the appliance components 832 comprise the mechanical or electronic elements that enable covert alerting device 630 to function as a normal wristwatch.

Communication interface 836 comprises a wireless transceiver capable of communication via Bluetooth, Wi-Fi, WiMAX, RF, or any form of wireless communication that could transmit between wireless telephone 600 and covert alerting device 630.

Alert mechanism 834 could comprise a magnetic or pneumatic piston that protrudes from covert alerting device 630 and touches user 608. For example, if covert alerting device 630 is a wristwatch, then alert mechanism 834 could be a piston build into the back of the wristwatch that protrudes and pokes user 608 in the event of a call from a covert communication source.

Alert mechanism 834 could also comprise a rotating wheel, a moving bristle, or any other physical touch alert that is perceptible only to user 608. Alert mechanism 834 cannot be perceived by others in the proximity of covert alerting device 630 because it is silent to the human ear, not in visible sight, and not a perceptible movement to anyone aside from user 608.

Alternatively, alert mechanism 834 could also be a covert change in the functionality of covert alerting device 630. For example, if covert alerting device 630 is a watch with a second hand, then alert mechanism 834 may be a change in the motion of the second hand. The change in the motion of the second hand comprises moving the second hand at five-second increments instead of the usual one-second increments, stopping movement of the second hand, pointing the second hand to a predetermined number on the face of the watch, or any other alteration in the functionality of the watch that is perceptible to user 608 and not obvious to others in the immediate area.

Additionally, the covert communication alert may be personalized for different covert communication sources. For example, in response to the receipt of a message from covert communication source A, the second hand of the watch may point to the number 3. Further, in response to the receipt of a message from covert communication source B, the second hand of the watch may point to the number 9. The covert communication alert may also indicate the priority level of a covert communication.

Figure 9:
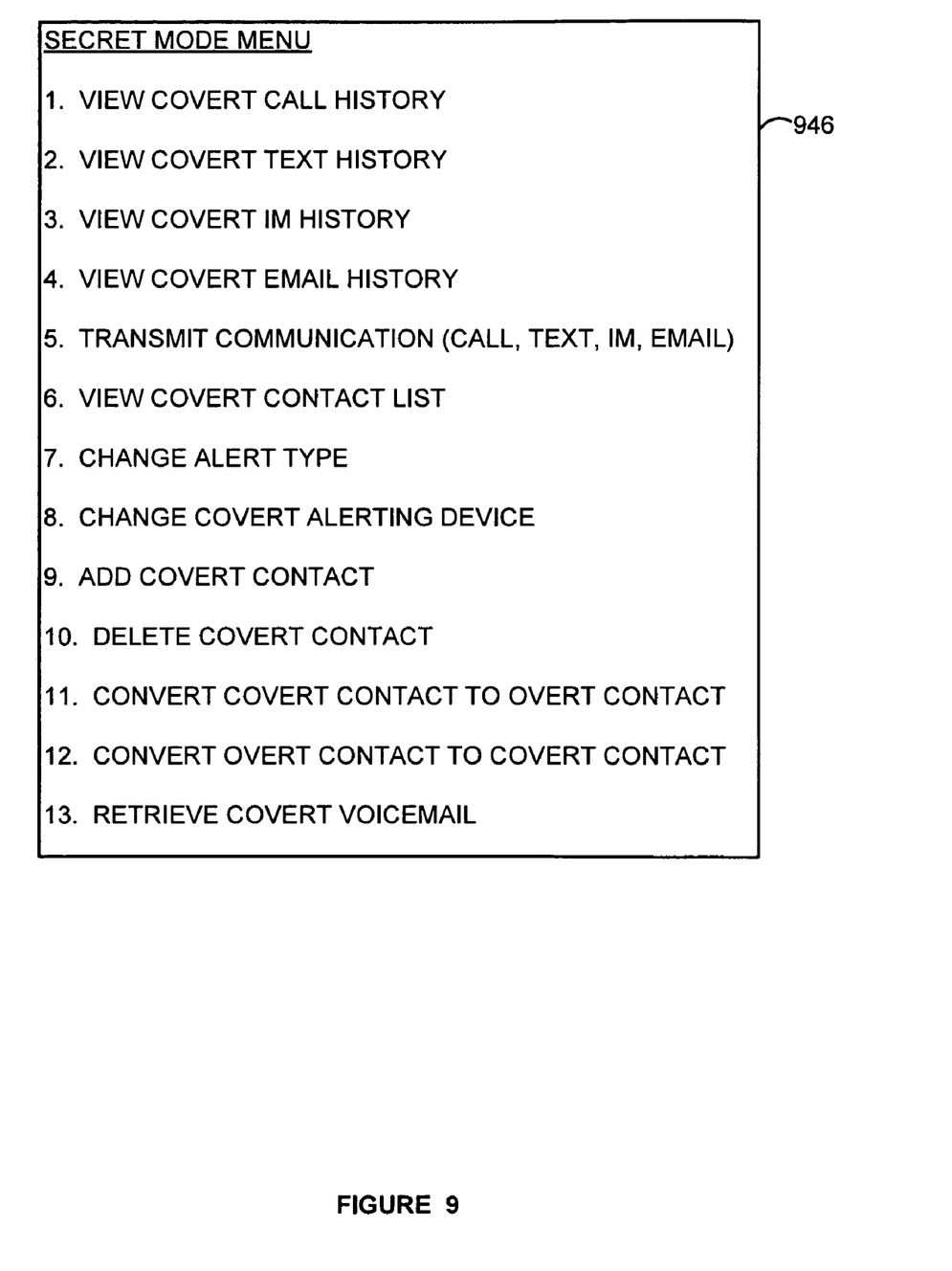
FIG. 9 is a block diagram that illustrates a user menu.

FIG. 9 is a display diagram that illustrates an example of a user menu. Secret mode menu 946 is displayed to user 608 in user interface 103 when wireless telephone 600 is in secret mode. Secret mode menu 946 comprises the following thirteen options: view covert call history, view covert text history, view covert IM history, view covert email history, transmit communication (in the form of call, text, IM, or email), view covert contact list, change alert type, change covert alerting device, add covert contact, delete covert contact, convert covert contact to overt contact, convert overt contact to covert contact, and retrieve covert voicemail. Secret mode menu 946 may comprise other user options not shown in FIG. 9.

When selected by user 608, option 1, view covert call history, displays a list of calls made, calls received, and missed calls along with a contact name and telephone number for each call related to a covert communication source.

When selected by user 608, option 2, view covert text history, displays a list of text messages sent, text messages received, and pending text messages along with a contact name and telephone number for each text message related to a covert communication source.

When selected by user 608, option 3, view covert IM history, displays a list of instant messages sent, instant messages received, and pending instant messages along with a contact name and IM ID for each instant message related to a covert communication source.

When selected by user 608, option 4, view covert email history, displays a list of emails sent, emails received, and pending emails along with a contact name and email address for each email related to a covert communication source.

When selected by user 608, option 5, transmit communication (call, text, IM, email), sends a selected communication to a selected covert communication source.

When selected by user 608, option 6, view covert contact list, displays a list of covert communication sources designated by user 608 while in secret mode.

When selected by user 608, option 7, change alert type, allows user 608 to select the type of covert communication alert that wireless telephone 600 provides upon receiving a communication from a covert communication source. For example, user 608 might select a rotating battery icon alert, a moving signal strength indicator alert, a change in display text color alert, no alert, or any other covert communication alert.

When selected by user 608, option 8, change covert alerting device, allows user 608 to select the type of covert alerting device to use for a covert communication alert. For example, user 608 might select a watch, a ring, a pen, or some over covert alerting device.

When selected by user 608, option 9, add covert contact, allows user 608 to designate, create, and store a contact name for an additional covert communication source. The additional covert communication source will then be displayed when option 6, view covert contact list, is selected by user 608.

When selected by user 608, option 10, delete covert contact, allows user 608 to delete a previously designated covert communication source from the covert contact list.

When selected by user 608, option 11, convert covert contact to overt contact, allows user 608 to select a covert communication source from the covert contact list to transfer to an overt contact list. Once the covert communication source has been transferred to an overt contact, communication from the overt contact will be processed as an overt communication source and will produce overt communication alerts.

When selected by user 608, option 12, convert overt contact to covert contact, allows user 608 to select an overt communication source to transfer to the covert contact list. Once the overt communication source has been transferred to a covert contact, communication from the covert contact will be processed as a covert communication source and will produce covert communication alerts.

When selected by user 608, option 13, retrieve covert voicemail, allows user 608 to listen to voicemail messages from covert communication sources.

In some embodiments, user 608 may enable and disable the covert communication alert function in wireless telephone 600. If the covert communication alert function is disabled, wireless telephone 600 provides overt communication alerts for all incoming communications, whether from overt communication sources or covert communication sources. If the covert communication alert function is enabled, then wireless telephone 600 provides covert communication alerts for incoming communications from covert communication sources and provides overt communication alerts for incoming communications from overt communication sources.

In some embodiments the covert communication alert function in wireless telephone 600 is enabled and disabled based on a Global Positioning System (GPS) location. For example, if user 608 is at a home location, then the covert communication alert function is enabled, but if user 608 is at a work location, then the covert communication alert function is disabled.

In some embodiments, communications received from or transmitted to a covert communication source are not displayed on a user's service bill. The user is still charged for the covert communications, but no information about the covert communication source or the communications themselves are shown on the user's bill. In one example, the covert communication charges could be sent to the user in a separate bill to a different location. Covert billing, emails, and other forms of communication could be managed as defined by the user. These covert elements could be sent to a user-specified address that may be different from a home address, accessed from a wireless communication device with a passcode, accessed via the Internet with a passcode, or emailed to a user-specified email address Likewise, covert call history information could be sent to a user-specified address, accessed from a wireless communication device with a passcode, accessed via the Internet with a passcode, or emailed to a user-specified email address. Further, covert charges may be billed to a user-specified credit card that may be different from the credit card billed for overt charges. Finally, the covert charges may be added as a miscellaneous charge or incorporated into a bulk charge on the user's service bill.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication device having a secret mode, the method comprising:

entering the secret mode in response to receiving a secret mode access key, wherein the secret mode access key comprises authentication data;

in the secret mode, receiving a first instruction to handle a covert communication source in the secret mode, and receiving a second instruction to exit the secret mode; and after exiting the secret mode and in response to the first instruction, providing a covert communication alert for an incoming communication from the covert communication source and providing overt communication alerts for incoming communications from overt communication sources, wherein providing the covert communication alert comprises changing a position of a battery power icon displayed on a display of the communication device.

2. The method of claim 1 further comprising, after exiting the secret mode and in response to the first instruction, blocking communication history information for the covert communication source and providing other communication history information for the overt communication sources.

3. The method of claim 2 further comprising re-entering the secret mode in response to receiving the secret mode access key, and in the secret mode, providing the communication history information for the covert communication source.

4. The method of claim 3 wherein providing the covert communication alert comprises providing the communication history information for the covert communication source while in the secret mode.

5. The method of claim 1 wherein the covert communication alert comprises a wireless alerting signal transmitted to a covert alerting device.

6. The method of claim 5 wherein the covert alerting device provides a communication indicator in response to receiving the wireless alerting signal.

7. The method of claim 6 wherein the covert alerting device receives a user acknowledgement of the communication indicator, and in response, transmits a wireless acknowledgement signal, and further comprising in the communication device, receiving the wireless acknowledgement signal, and in response, transmitting a communication acknowledgement signal to the covert communication source.

8. The method of claim 7 wherein the covert alerting device comprises a watch.

9. A communication device having a secret mode comprising:

a network interface configured to receive incoming communications;

a processing system configured to enter the secret mode in response to receiving a secret mode access key, wherein the secret mode access key comprises authentication data, and in the secret mode, receive a first instruction to handle a covert communication source in the secret mode, and receive a second instruction to exit the secret mode;

a user interface configured to receive the secret mode access key, the first instruction, and the second instruction from a user;

the processing system further configured, after exiting the secret mode and in response to the first instruction, to generate a covert communication alert for the incoming communication from the covert communication source and generate overt communication alerts for the incoming communications from overt communication sources; and the user interface configured to provide the covert communication alert and the overt communication alerts, wherein the user interface configured to provide the covert communication alert comprises the user interface configured to change a position of a battery power icon displayed on a display of the communication device.

10. The communication device of claim 9 wherein the processing system is configured, after exiting the secret mode and in response to the first instruction, to block communication history information for the covert communication source and to provide other communication history information for the overt communication sources, and wherein the user interface is configured to display the other communication history information for the overt communication sources.

11. The communication device of claim 10 wherein the processing system is configured to re-enter the secret mode in response to receiving the secret mode access key, and in the secret mode, provide the communication history information for the covert communication source, and wherein the user interface is configured to display the communication history information for the covert communication source.

12. The communication device of claim 11 wherein the covert communication alert comprises the display of the communication history information for the covert communication source while in the secret mode.

13. The communication device of claim 9 wherein the user interface is configured to covertly provide the covert communication alert by transmitting a wireless alerting signal to a covert alerting device.

14. The communication device of claim 13 wherein the covert alerting device provides a communication indicator in response to receiving the wireless alerting signal.

15. The communication device of claim 14 wherein the covert alerting device receives a user acknowledgement of the communication indicator, and in response, transmits a wireless acknowledgement signal, and wherein the user interface is configured to receive the wireless acknowledgement signal, the processing system is configured to convert the wireless acknowledgement signal into a communication acknowledgement signal, and the network interface is configured to transfer the communication acknowledgement signal to the covert communication source.

16. The communication device of claim 15 wherein the covert alerting device comprises a watch.

* * * * *